June 27, 1950

H. H. HATCHETT

HOLDER PANEL FOR REMOVABLY MOUNTING THEREON INDICIA BEARING CARDS 2,513,239

Filed Sept. 28, 1949

2 Sheets-Sheet 1

INVENTOR
Henry Hines Hatchett
BY
Benjamin Sweedler
ATTORNEYS

HOLDER PANEL FOR REMOVABLY MOUNTING THEREON INDICIA BEARING CARDS

INVENTOR
Henry Hines Hatchett
BY
Benjamin Sweedler
ATTORNEY

Patented June 27, 1950

2,513,239

UNITED STATES PATENT OFFICE 2,513,239

HOLDER PANEL FOR REMOVABLY MOUNTING THEREON INDICIA BEARING CARDS

Henry Hines Hatchett, Jackson Heights, N. Y.

Application September 28, 1949, Serial No. 118,368

5 Claims. (Cl. 40—124)

This invention relates to holders for indicia, which holders when the desired indicia are placed thereon give a visual record suitable for use in scheduling production or sales and controlling traffic, radio or television station programs, etc.

It is among the objects of this invention to provide such holder which is compact and simple in design, which can be manufactured economically, which is efficient in use particularly in that it permits the ready insertion and removal of indicia bearing cards, and, when such cards are inserted in the card holding members, firmly maintains them in place, which provides for an attractive arrangement of indicia giving at a glance desired information concerning production, sales, program arrangement, etc., and which is constructed so that a plurality of such holders can be arranged in substantially abutting relation to provide a control board or panel of any desired size to give a visual record or schedule suitable for controlling any operation no matter how involved or extensive.

Other objects and advantages of this invention will be apparent from the following detailed description thereof.

In accordance with this invention a holder is provided consisting of a suitable flat rigid base, preferably a light metal or metal alloy, such as aluminum or aluminum alloy, which has integrally formed in the face thereof parallel vertical rows of rosettes, the rows preferably, but not necessarily, being equispaced from each other and the rosettes within each row being preferably, but not necessarily, equispaced from each other. Each rosette comprises four segmental conical members arranged with the bases of the cones equispaced about a circle and with the apexes extending towards each other and truncated to form at the center of the circle a flat surface in the same plane as that in which the base is disposed. The segmental conical formation permits the ready insertion and removal of the cards and, as will be explained more fully hereinafter, results in frictional engagement between the inner wall of each member and the corner of each card which retains the card relatively firmly in position minimizing accidental displacement thereof.

In the accompanying drawings forming a part of this specification and showing for purposes of exemplification preferred forms of this invention without limiting the claimed invention to such illustrative instances, Figure 1 is a plan view of a holder embodying this invention;

Figures 1, 2:
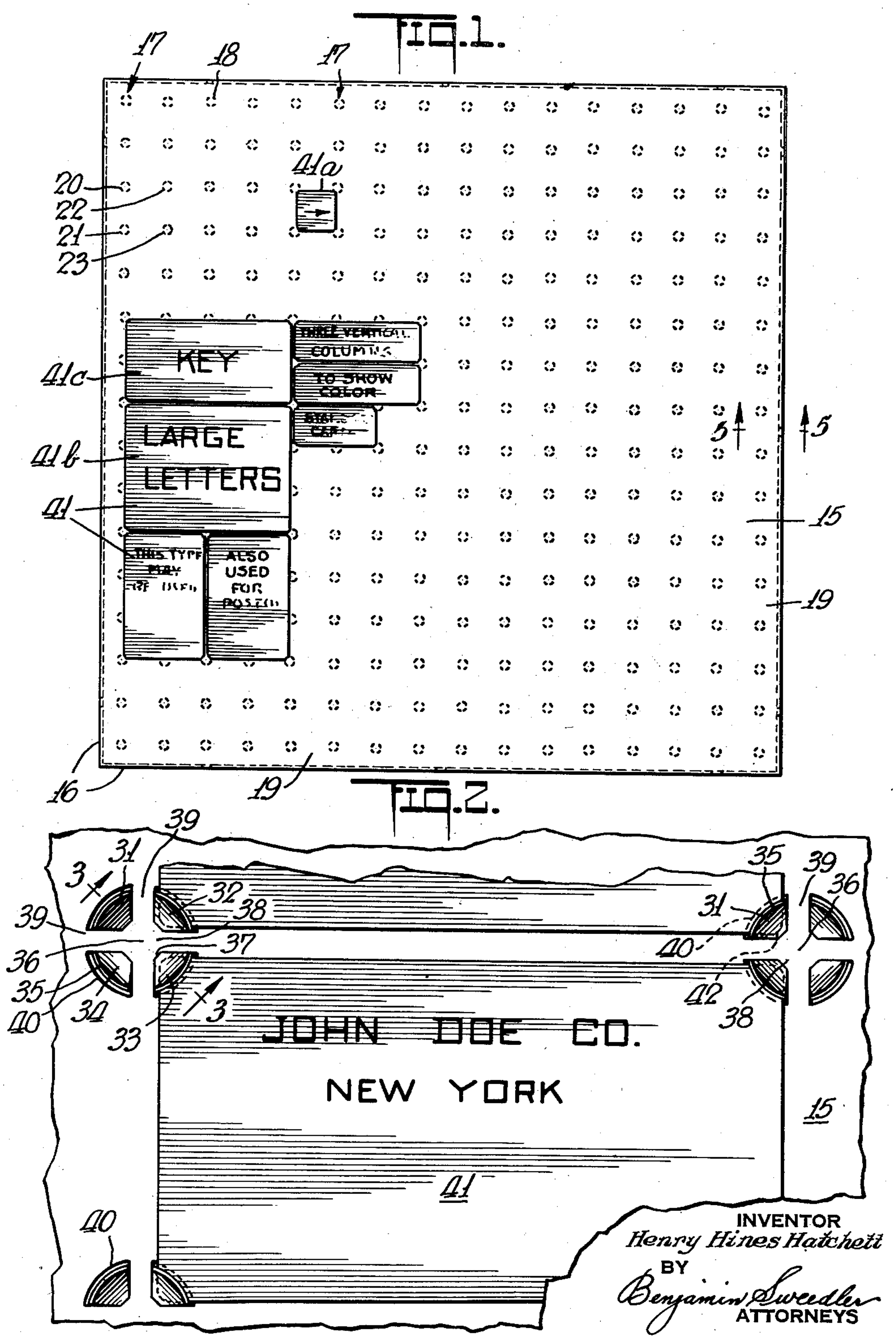
Figure 2 is a fragmentary plan view of a portion of the holder on a greatly enlarged scale as compared with the scale of Figure 1 to show more clearly the construction of the rosettes.

In the drawing 15 indicates a flat supporting base desirably provided with flanges 16 (Figure 5) which may be integrally formed with the top and bottom edges, as well as the side edges. Preferably the supporting base 15 in the modification of Figures 1 to 7, inclusive, is of sheet metal sufficiently thick to provide a rigid support, although, if desired, this base may be of plastic or other suitable material.

The base is formed with vertical rows 17 of rosettes 18. The rows 17 are parallel and extend from top to bottom of the base leaving a margin 19 surrounding the rows 17. This margin 19 is of uniform width on all four sides of the base and of a width equal to one-half the width of the spacing between contiguous vertical rows 17 and also one-half the width of the spacing between contiguous rosettes in each row in the modification of Figure 1. In this modification the rosettes of contiguous rows are arranged so that oppositely disposed pairs of rosettes of contiguous rows form a square. Thus, rosettes 20, 21, 22 and 23, for example, define the corners of a square.

Figures 3, 4, 5, 6, 7, 8:
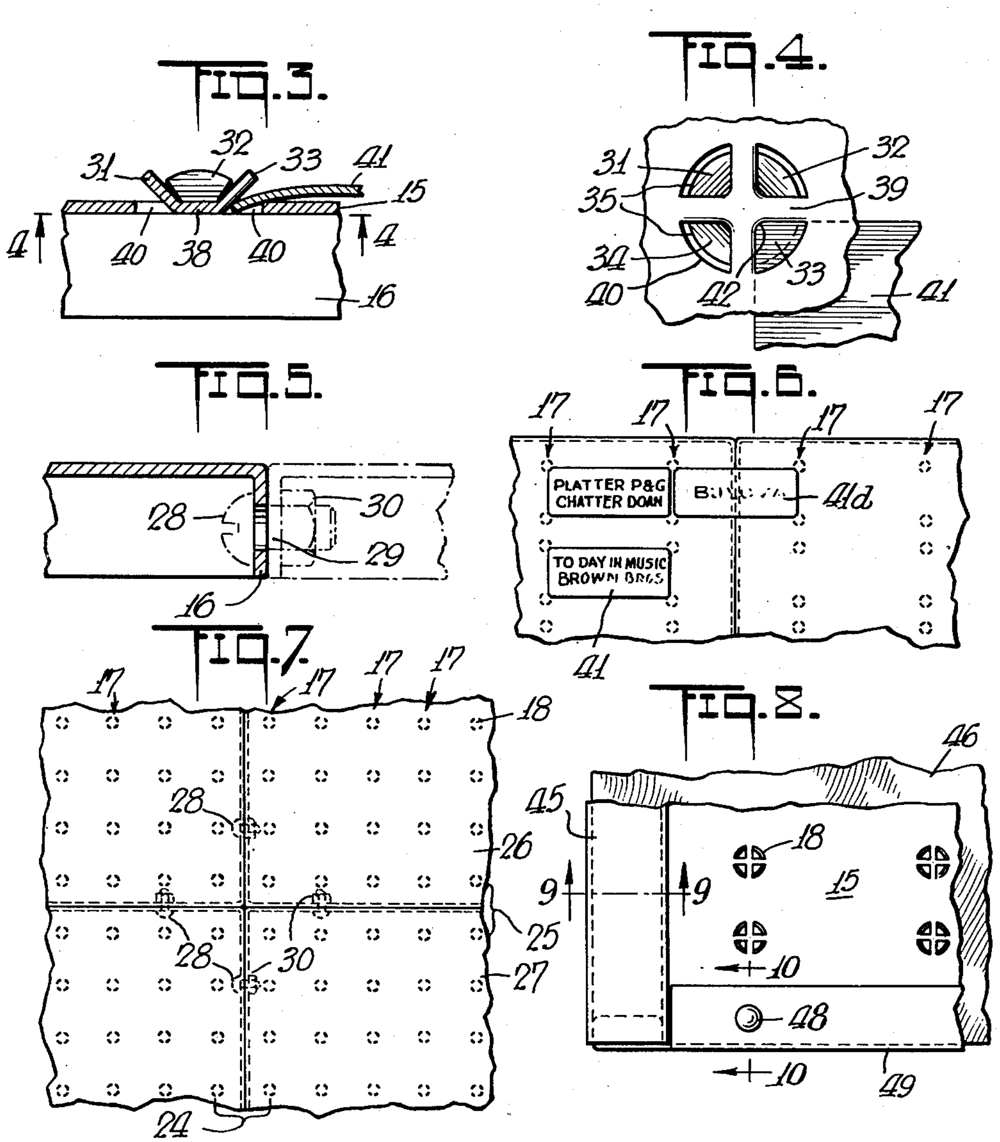
Figure 3 is a vertical section taken in a plane passing through line 3—3 of Figure 2.
Figure 4 is a fragmentary rear view looking at the holder in the direction indicated by the arrows 4—4 on Figure 3, i. e., viewing the underside of the holder and showing one corner of a card in position within one of the truncated conical members of a rosette.
Figure 5 is a fragmentary vertical section showing two holders in abutting relationship, the view being taken in a plane passing through line 5—5 of Figure 1.
Figure 6 is a fragmentary plan view of two holders disposed in abutting relationship, the holders each having a different arrangement of rosettes from that shown in Figure 1.
Figure 7 is a plan view showing an arrangement of four holders in abutting relationship.
Figure 8 is a fragmentary plan view of a modified form of holder.

When the holders of the type shown in Figure 1 are disposed in abutting relation, as shown in Figure 7, the distance between the terminal vertical rows 17 of contiguous holders is the same as that between contiguous rows on the individual holders, i. e., the distance indicated by the reference character 24 is the same as the distance between any other pair of contiguous rows 17 shown in Figure 7. In like manner when the holders are disposed with the base of one holder in abutting relation with the top of a contiguous holder, as shown in Figure 7, the distance 25 between the rosettes of the abutting holders 26, 27 is the same as that between contiguous rosettes in the same row.

In Figures 5, 6 and 7 contiguous holders are joined together and held thus joined by means of bolts 28 passing through aligned openings 29 in the flanges 16. Nuts 30 are threaded on bolts 28 to securely maintain the assembly. Each flange 16 of the holder is provided with two or more such openings 29, preferably near the terminal ends of each flange. As shown in Figure 6, two holders may be thus joined in abutting relationship to form a panel having twice the size of one holder, or as shown in Figure 7 four holders may be clamped together to form a panel having four times the size of one holder. It will be understood that any desired number of holders may be clamped together in abutting relationship to produce a control board or panel of any desired size, which board or panel has parallel rows of rosettes equispaced throughout the extent of the board irrespective of the number of sections joined together to form the panel.

Each rosette comprises four segmental conical members 31, 32, 33 and 34 arranged with the bases 35 of the cones equispaced about a circle, the center of which is indicated by the reference character 36. Thus, the longitudinal axes of these conical members of each rosette are spaced approximately 90° from each other. The apexes of these cones are truncated, as at 37, forming at the center of the circle a flat surface 38 in the same plane as that in which the base is disposed. Portions 39 of the base separating the equispaced segmental conical members 31, 32, 33 and 34 of each rosette are located on the horizontal and vertical diameters of the aforementioned circle defining the outline of the rosette, thus positioning the members so that diagonally opposite members 32, 34 face in opposite directions to receive respectively the lower left-hand corner of one card and the upper right-hand corner of the next lower card in the next adjacent row, and the members 31 and 33 are diagonally disposed to receive respectively the lower corner of one card and the upper corner of the lower card in the next row, respectively. In other words, each member 31, 32, 33 and 34 is adapted to receive a corner of a card, the four cards being disposed in two contiguous rows.

The rosettes are preferably formed by die punching the sheet metal, preferably aluminum or aluminum alloy, constituting the base. This punching operation is carried out to first form a slit 40 defining the conical base of each member 31, 32, 33 and 34 of each rosette. This slit extends through the thickness of the base 15. The die punching then expands the metal to form the conical segments 31, 32, 33 and 34 which thus have peripheral walls extending above the face of the base 15 of segmental conical or flared shape, i. e., each member 31, 32, 33 and 34 has its base edge 35 disposed above the normal plane of base 15 and inclined downwardly from the base edge 35 so that the apex portion of the conical member lies in the same plane as the plane of the face of base 15 forming the central portion 38 of each rosette also disposed in the said plane.

Rectangular cards 41, preferably having rounded corners as indicated at 42 (Figures 2 and 4) having suitable indicia thereon may be mounted on an individual holder or panel. Cards of different sizes may be thus mounted. In all cases the cards are of a length slightly greater than the distance between the conical members of the rosettes in which they are to be mounted. Desirably the cards are of paper stock such that they are resilient and can be passed through a typewriter. As shown more clearly in Figure 3, each corner of a card passes through a slit or slot 40 of a conical member. The sides of the corner portion of each card are in frictional contact with the inner wall of the conical portion 31, 32, 33 or 34 of a rosette as the case may be. This frictional engagement coupled with the resiliency of the card and the fact that it is of a length slightly greater than the distance between the conical members in which the card is disposed firmly maintains the card in position minimizing accidental displacement. To remove a card it is only necessary to apply a slight pressure in a horizontal direction to cause the corners on one side to slide out of the holder member in which they are disposed whereupon the card can readily be removed. In replacing the card or placing a new card in the holder, the corners on one side of the card are first disposed in a pair of holder members, the card bowed slightly and the opposite corners mounted in the opposite pair of holder members for receiving them.

Desirably the rosettes are approximately ¼" in diameter, although larger rosettes may be employed. While the conical base portion 35 of each holder member of each rosette is flared so that it acts as a guide to cause the corner portion of a card to readily enter slot 40, the flared portion extends only a short distance above the plane of the face of the base. This permits the use of cards of various sizes from the smallest card 41*a*, shown in Figure 1, to much larger cards such as 41*b* and 41*c*. Cards 41*b*, for example, bridge the space between four rosettes in a vertical direction and five in a horizontal direction. Also in the case of panels made from a plurality of sectional holders, cards 41*d* (Figure 6) bridge the joint between adjacent sections, the construction of the rosettes hereinabove described permitting the use of any desired size cards in this locality of the panel. Accordingly, the holders or panels constituted of a plurality of holder sections permit the mounting thereon of cards of various sizes in distinctive arrangements giving a visual record or schedule suitable for controlling any operation no matter how involved or extensive.

Figure 9:
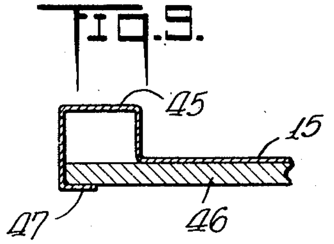
Figure 9 is a vertical section taken in a plane passing through line 9—9 of Figure 8.
Figure 10:
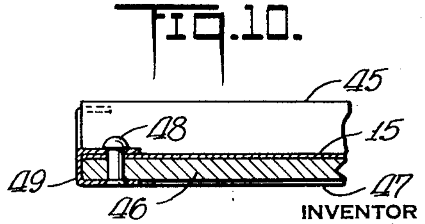
Figure 10 is a vertical section taken in a plane passing through line 10—10 of Figure 8.

In the modification of Figures 8, 9 and 10 the base 15 is of metal, such as sheet aluminum of somewhat less rigidity than that employed in making the base of the modification of Figures 1 to 7, inclusive. Desirably, the base 15 in the modification of Figures 8, 9 and 10 is formed with a raised flange 45 shaped as shown in Figure 9 to form a border flange at each side of the base. To impart rigidity to the base a fibrous board, such as a "Beaver" board or Celotex board 46 is secured to the base. The terminal ends 47 pass around the side of this board, as shown in Figure 9. Riveted to the top and bottom edges, as by rivets 48, is a U-shaped channel 49 which securely clamps the board 46 to the metal base plate 15.

From the above description of the invention it will be noted the holder of this invention is compact and simple in design, can be manufactured economically since it involves chiefly a simple die punching and shaping operation for its manufacture, permits the ready insertion and removal of indicia bearing cards, holds such cards firmly in position and provides for an attractive arrangement of indicia giving at a glance desired information mounted thereon.

Since different embodiments of the invention could be made without departing from the scope of this invention, it is intended that all matter contained in the above description or shown in the accompanying drawings shall be interpreted as illustrative and not in a limiting sense. For example, while in the drawings the rosettes 18 have been shown equispaced within each row, they may be otherwise spaced. For example, in the case of a control program for radio or television program control it has been found desirable to have at least two contiguous rows of rosettes arranged so that within the row the 1st and 2nd, 3rd and 4th, 5th and 6th rosettes, etc., are spaced further apart than the 2nd and 3rd, 4th and 5th, 6th and 7th rosettes, respectively. Such spacing is shown in Figure 6.

What I claim as new and desire to secure by Letters Patent is:

1. A holder for a plurality of rectangular cards constructed for the ready removal and replacement of said cards, said holder comprising a relatively rigid flat supporting base, a plurality of vertical parallel rows of rosettes extending from the face of said base, each rosette comprising four segmental conical members arranged with the bases of the conical members spaced about a circle, the peripheral surface of the base of each conical member protruding beyond the face of said base, inclined gradually downwardly and merging into the face of said base forming at the central portion of said circle a surface in substantially the same plane as the face of said base, the longitudinal axes of said four segmental conical members constituting each rosette being spaced approximately 90° from each other.

2. A holder as defined in claim 1, in which the base consists of sheet metal and a fibrous board backing is secured to said sheet metal base to impart rigidity thereto.

3. A holder for a plurality of rectangular cards constructed for the ready removal and replacement of said cards, said holder comprising a relatively rigid flat supporting base, a plurality of vertical parallel rows of rosettes extending from the face of said base, each rosette comprising four segmental conical members arranged with the bases of the conical members equispaced about a circle, and providing curved openings extending through said base, the peripheral surface of the base of each conical member protruding beyond the face of said base, inclined gradually downwardly and merging into the face of said base forming at the central portion of said circle a surface in substantially the same plane as the face of said base.

4. A holder for a plurality of rectangular cards constructed for the ready removal and replacement of said cards, said holder comprising a relatively rigid flat supporting base, a plurality of vertical parallel rows of rosettes extending from the face of said base, each rosette comprising four segmental conical members arranged with the bases of the conical members equispaced about a circle, and providing curved openings extending through said base, the peripheral surface of the base of each conical member protruding beyond the face of the base and inclined gradually downwardly with the apex portion of each conical member in the same plane as the face of said base, said rosettes in each row being equispaced from each other and the margins at the sides of said base having a width approximately equal to one-half the distance separating contiguous rows and the margins at the top and bottom of said base each having a width approximately one-half the distance between contiguous rosettes in the same row, whereby said holder may be arranged in abutting relation with other like holders to form a panel consisting of a plurality of such holders with the rows of rosettes throughout said panel having the same relative spacing between them.

5. A holder as defined in claim 4, which is substantially square.

HENRY HINES HATCHETT.

No references cited.